US005743586A

United States Patent [19]
Nett

[11] Patent Number: 5,743,586
[45] Date of Patent: Apr. 28, 1998

[54] HARD SHELL TONNEAU COVER

[75] Inventor: James A. Nett, Oklahoma City, Okla.

[73] Assignee: Covercraft Industries, Pauls Valley, Okla.

[21] Appl. No.: 796,245

[22] Filed: Feb. 6, 1997

[51] Int. Cl.$^6$ .................................................. B60F 7/02
[52] U.S. Cl. ..................................................... 296/100
[58] Field of Search ........................................... 296/100

[56] References Cited

U.S. PATENT DOCUMENTS

| | | | |
|---|---|---|---|
| 3,012,814 | 12/1961 | Penner | 296/100 |
| 3,155,423 | 11/1964 | Cripe | 296/100 |
| 4,762,360 | 8/1988 | Huber | 296/100 |
| 4,861,092 | 8/1989 | Bogard | 296/100 |

*Primary Examiner*—Gary C. Hoge
*Attorney, Agent, or Firm*—Pillsbury Madison & Sutro LLP

[57] ABSTRACT

A tonneau cover for a pickup truck is provided with a generally rigid panel structure composed of a sheet of polystyrene foam, between two relatively thin sheets of a generally rigid fiberglass or other composite material. A sheet of padding material and a sheet of protective plastic or vinyl, are disposed on one of the two rigid sheets. A side bracket is secured to each side of the layered sheet panel structure. Each side bracket includes a generally "C"-shaped channel for receiving an edge of the panel structure. Each side bracket also defines a generally "L"-shaped bracket portion for receiving and securing, by snap-fit engagement, a side molding piece. A corner bracket is secured to each of two perpendicular side brackets at each corner of the panel structure. The corner bracket includes a receptacle for receiving and securing a corner molding piece thereto. Latches and struts secure the cover to the interior surfaces of the truck side walls, such that no latches or other attaching mechanisms are visible from the exterior of the truck. The cover does not attach to or interfere with the operation of the truck tailgate, such that the tailgate may be opened or closed, while the cover is in a closed position on the truck bed.

3 Claims, 5 Drawing Sheets

HARD SHELL TONNEAU COVER

BACKGROUND OF THE INVENTION

1. Field of the Invention

The present invention relates to apparatus and methods for covering the bed of a pickup truck, other vehicle or the like and, in particular embodiments, to apparatus and methods for providing a generally rigid, padded cover extending over the bed of a pickup truck including a mechanism or step for supporting the cover in a partially raised position.

2. Description of Related Art

Modern pickup trucks are typically provided with open bed areas bordered by the side walls, front wall (or cab wall) and tailgate of the truck bed. An example of a conventional pickup truck is shown in FIG. 1 and includes an open bed 10 bordered on two sides by side walls 12 and 14, on the front side by the front wall 16 (which, in some trucks, is the rear cab wall), and a tailgate 18. The interior 20 of the bed 10 in FIG. 1 is open to the environment from the top of the bed.

The open top of the bed tends to affect the relative air flow over the vehicle at typical driving speeds and tends to cause adverse aerodynamic (drag) affects. In addition, the open bed can tend to inadequately protect items stored in the bed from exposure to environmental elements, from being jarred out of the bed and from potential theft. In addition, the open interior of the bed can be aesthetically displeasing, especially if the interior is used as a work/storage space and prone to dents and scratches during use.

As a result, a popular practice among modern pickup truck owners is to cover the bed of the pickup truck with a covering material. One typical approach is to cover the interior of the truck bed with a flexible fabric which is tied down to the side walls, tailgate and front wall of the truck bed. However, these approaches typically require tie mechanisms to be positioned on all walls and the tailgate of the truck and can be cumbersome and time-consuming to operate, thus making it relatively inconvenient to access the interior of the truck bed once the fabric is tied down over the bed. In addition, the tie down mechanisms can be aesthetically displeasing and can also adversely affect the air-resistance characteristics of the vehicle.

SUMMARY OF THE DISCLOSURE

Accordingly, it is an object of the present invention to provide an improved apparatus and process for covering the bed of a pickup truck and which minimizes some or all of the above-noted deficiencies of prior cover designs, Further embodiments of the present invention are applicable as covers for other vehicles or the like.

According to preferred embodiments, a tonneau cover for a pickup truck is provided with a generally rigid panel structure composed of a sheet of light-weight material, such as polystyrene foam, between two relatively thin sheets of a generally rigid material, such as fiberglass or other composite material. A sheet of padding material and a sheet of protective material, such as plastic or vinyl, are disposed on one of the two rigid sheets.

A side bracket is secured to each side of the layered sheet panel structure. Each side bracket includes a generally "C"-shaped channel for receiving an edge of the panel structure. Each side bracket also defines a generally "L"-shaped bracket portion for receiving and securing, by snap-fit engagement, a side molding piece. A corner bracket is secured to each of two perpendicular side brackets at each corner of the panel structure. The corner bracket includes a receptacle for receiving and securing a corner molding piece thereto. The corner bracket and the side brackets are concealed behind the side and corner molding pieces, upon the molding pieces being secured to the brackets. The side molding pieces preferably extend below the bottom surface of the side bracket, so as to provide an aesthetically pleasing transition between the cover and the truck bed side walls, for a variety of side wall tapering angles.

Latches and struts preferably secure the cover to the interior surfaces of the truck side walls, such that no latches or other attaching mechanisms are visible from the exterior of the truck. Preferably, the cover does not attach to or interfere with the operation of the truck tailgate, such that the tailgate may be opened or closed, while the cover is in a closed position on the truck bed.

BRIEF DESCRIPTION OF THE DRAWINGS

The detailed description will be made with reference to the accompanying drawings, wherein like numerals designate corresponding parts in the several figures.

DETAILED DESCRIPTION OF PREFERRED EMBODIMENTS

The following detailed description is of the best presently contemplated mode of carrying out the invention. This description is not to be taken in a limiting sense, but is made merely for the purpose of illustrating the general principles of embodiments of the invention. The scope of the invention is best defined by the appended claims.

A preferred embodiment of a tonneau cover according to the present invention is shown with respect to FIGS. 2–6. While preferred embodiments (including the illustrated embodiment) of the present invention are designed as covers for pickup truck beds, it will be readily understood that aspects of the invention (and further embodiments of the invention) are applicable and include covers for other vehicles and the like. However, for purposes of simplifying the present disclosure, aspects of the invention are discussed and illustrated herein with respect to a cover for the bed of a pickup truck.

Figure 1:
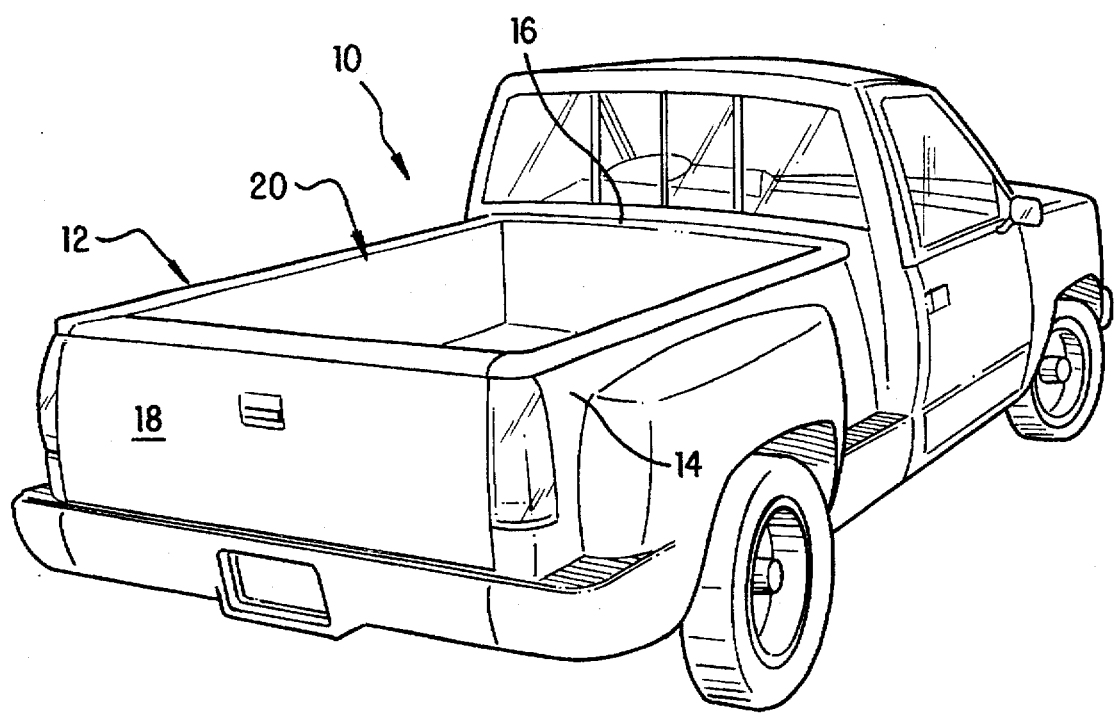
FIG. 1 is a perspective view of a conventional pickup truck, without a cover over the truck bed.
Figure 2:
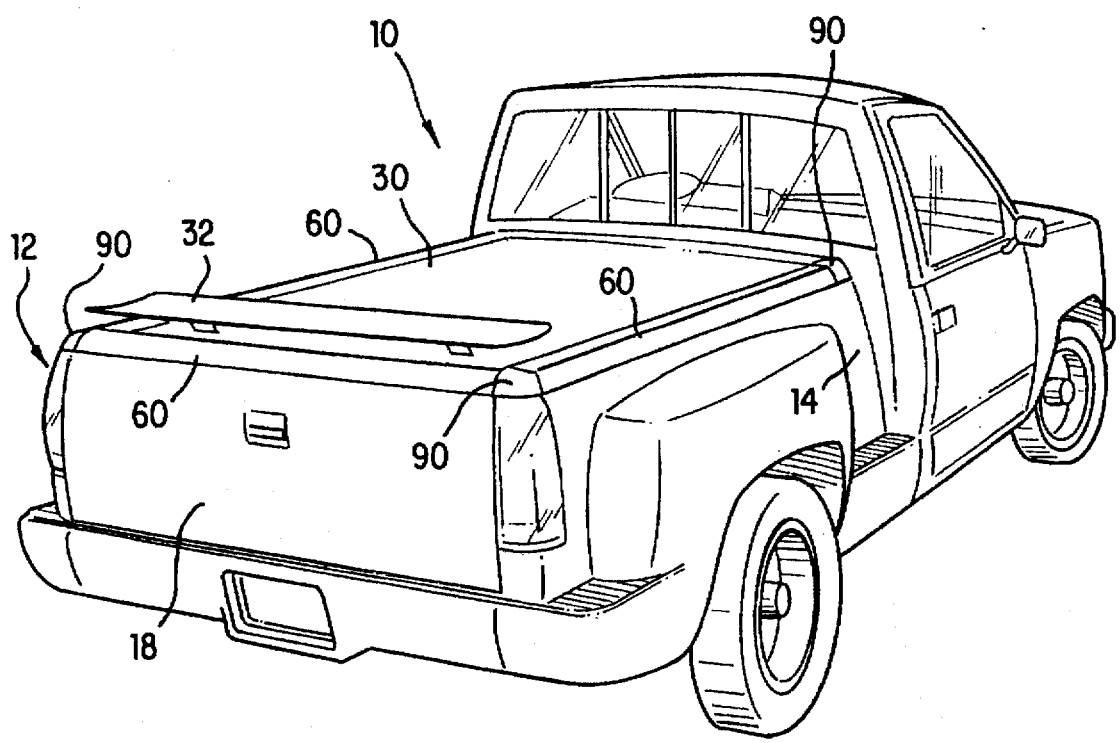
FIG. 2 is a perspective view of a conventional pickup truck, but with a cover, according to an embodiment of the present invention, disposed over the truck bed.

With respect to FIG. 2, a cover 30 is shown as being supported over the bed 10 of a pickup truck. The cover shown in FIG. 2 is provided with a spoiler 32 for aesthetic and aerodynamic purposes. However, other embodiments may be provided without a spoiler.

The cover 30 is shaped, generally as a relatively rigid, rectangular plate having a length and width slightly larger than the length and width of the bed interior, such that the cover rests on the upper surfaces of the side walls 12 and 14 of the bed, when placed over the bed interior. In preferred embodiments, the cover 30 is moveable between a closed position as shown in FIG. 2 (in which the cover 30 closes the otherwise open top of the bed) and an opened position as shown in FIG. 3 (in which the cover 30 is supported in an inclined position relative to the plane of the top of the bed, so as to expose the interior 20 of the bed).

Figure 3:
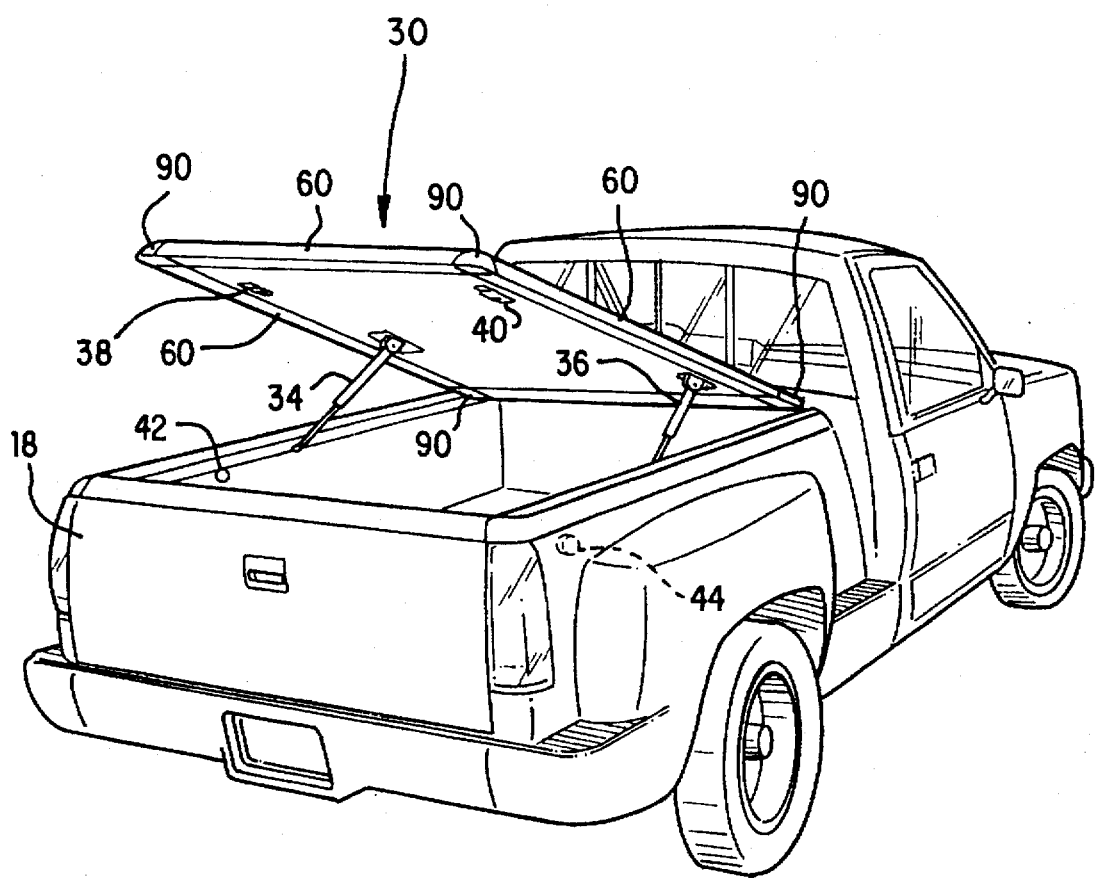
FIG. 3 is a perspective view of the pickup truck and cover of FIG. 2, but with the cover disposed in an open position.

The cover 30 is provided with at least one support mechanism for supporting the cover 30 in the inclined or opened position shown in FIG. 3. Hinges (not shown) may be provided between the front edge of the cover (the edge facing the truck cab) and the front wall of the truck bed. Alternatively, hinges may be omitted and the pivotal action of the cover may be controlled by the support mechanisms. In the illustrated embodiment, the support mechanism comprises a pair of pneumatic struts 34 and 36, which are each coupled at one end to the interior surface of a side wall 12 or 14 and at the other end to the cover 30. In further embodiments, other suitable support mechanisms, including but not limited to manually operable brackets or rods, may be employed as an alternative to the pneumatic struts. In yet further embodiments, support mechanisms for supporting the cover 30 in the opened position are omitted.

The cover 30 is also provided with at least one latching mechanism for latching the cover 30 to the truck bed in the closed position. In the illustrated embodiment, the latching mechanism comprises a pair of latches 38 and 40 which respectively engage a corresponding pair of latch engagement members 42 and 44. Any suitable known latch devices may be used for latches 38 and 40. The latch engagement members may be brackets, apertures or indentations in the truck bed walls, depending upon the type of latch devices used on the cover. Preferably, the latches 38 and 40 are manually operable and are located on the cover 30, near (e.g., within arms reach of) the rear of the pickup truck. Also preferably, the latch engaging members 42 and 44 are located on the interior surface of the side walls 12 and 14 of the bed. In this arrangement, the tailgate of the truck may be opened and the user may reach through the opened tailgate into the interior of the truck bed to manually operate the latches 38 and 40 to engage or disengage the latch engaging members 42 and 44. Once the latches are manually engaged or disengaged, the tailgate of the truck may be closed.

The structure of the cover is preferably designed to provide the necessary rigidity to maintain its shape when supported in the inclined or opened position, as shown in FIG. 3. It is also preferred that the structure of the cover be designed to readily accommodate various sizes and styles of truck beds. It is also preferred that the structure of the cover be designed to provide sufficient durability and strength and yet be aesthetically pleasing. A portion of a preferred cover structure for addressing these and other preferences is shown in cross-section in FIG. 4 and in an exploded view of FIG. 5.

Figure 4:
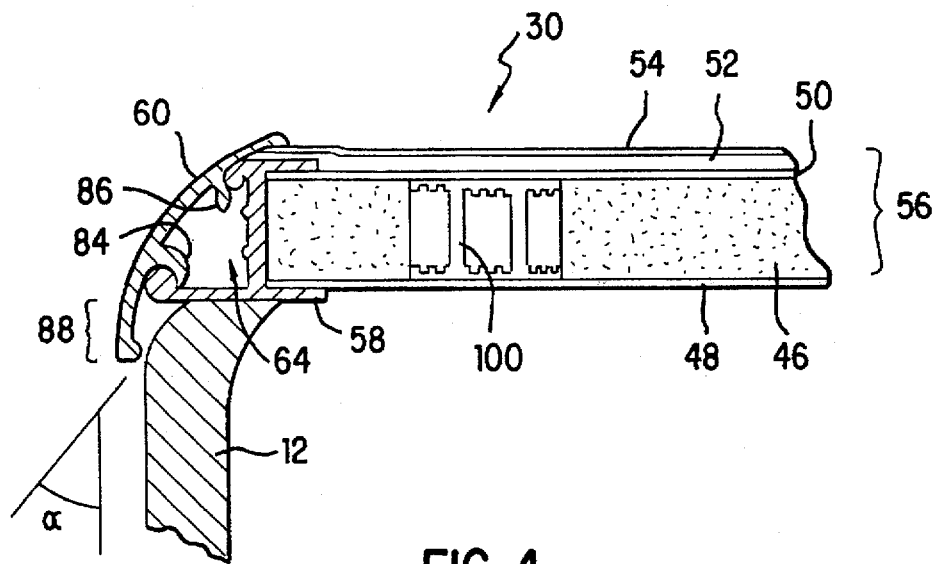
FIG. 4 is a cross-section view of a portion of the cover of FIGS. 2 and 3.
Figure 5:
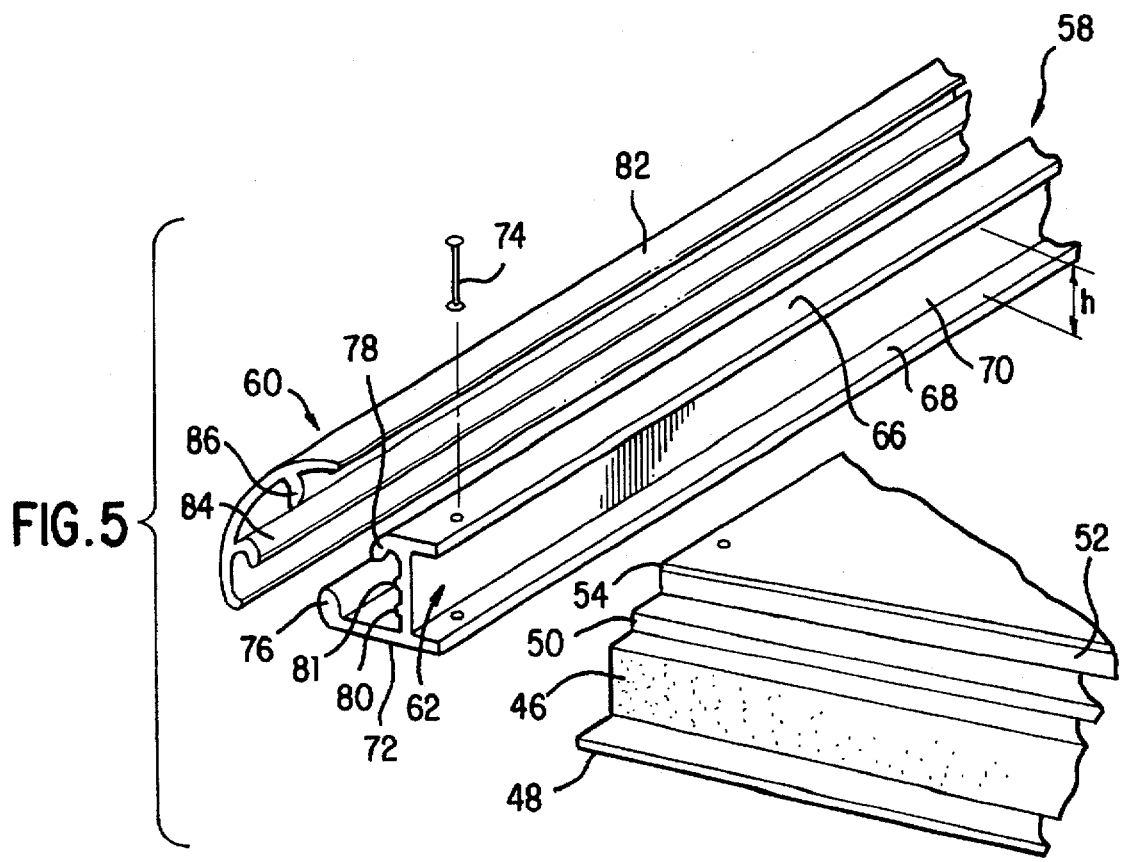
FIG. 5 is an exploded perspective view of a portion of the cover of FIGS. 2, 3 and 4.

With reference to FIGS. 4 and 5, the illustrated cover includes a sheet 46 of light-weight, rigid material, such as a polystyrene plastic foam material of suitable thickness. In a preferred embodiment, the sheet is an approximately one inch thick sheet of polystyrene plastic foam. However, other suitable thicknesses and materials may be employed without departing from the invention. In preferred embodiments, the sheet 46 of light-weight material is sandwiched between two thin sheets 48 and 50 of rigid material, such as plastic, fiberglass, other composite material or metal, for added strength. Preferably, the sheets 48 and 50 are adhered by a suitable adhesive to the planar surfaces of the sheet 46, to form a layered sheet structure.

A sheet 52 of padding material, such as a soft polyurethane foam material is disposed on the rigid sheet 50, and is preferably adhered thereto at least in the central regions of the sheets. The padding sheet 52 is covered by a protective layer 54, preferably formed with an aesthetically pleasing contour and color. In preferred embodiments, the protective layer 54 is formed as a sheet of water-proof, durable material, such as vinyl or other suitable plastic, adhered to one surface of the padding sheet 52. The resulting layered structure defines a light-weight panel 56 having suitable rigidity and strength to maintain its shape in the inclined or opened position, and having an aesthetically pleasing, padded upper surface.

The side edges of the layered sheet structure (or panel) are provided with edge brackets 58 which function to help maintain the layered sheets together (and minimize separation at the edges) and which also function to retain side molding pieces 60. Preferably, the brackets 58 are formed of an extruded aluminum or aluminum alloy material, although other suitable materials and manufacturing process may be used. In the illustrated embodiment, the cross-section shape of each bracket 58 defines a "C"-shaped channel 62 disposed back-to-back with a generally "L"-shaped bracket portion 64. The "C"-shaped bracket is defined by upper and lower legs 66 and 68, respectively, and a central beam 70 (which also forms one of the legs of the "L"-shaped bracket portion). The "L"-shaped bracket is defined by a vertical leg (defined as the central beam 70) and a horizontal leg 72.

The height h of the "C"-shaped channel is defined as the distance between the upper and lower legs 66 and 68, which is approximately equal to the combined thickness of the light-weight sheet 46 and the two rigid sheets 48 and 50. In this manner, the side edges of those sheets are disposed within the "C"-shaped channel as shown in FIG. 4. Rivets 74, or other suitable securing means (including, but not limited to bolts, screws, adhesives, or the like) are provided to secure the legs 66 and 68 to the layered sheets 46, 48 and 50. In this manner, the rivet heads (or the heads of threaded connectors) are disposed on the bracket legs, while the shaft of the rivets (or other connectors) extend through the layered sheets 46, 48 and 50, to help maintain the layers together, without the risk of the heads of the rivet (or other connectors) breaking through one or more sheet layers.

Preferably, the side edges of the padding sheet 52 and the protective layer 54 are disposed above and overlap the upper leg 66 of the "C"-shaped channel, as shown in FIG. 4. This helps hide the bracket 58 from view, as well as helps to protect the bracket from environmental elements.

The "L"-shaped bracket portion 64 defines a length-wise, rounded extension 76 on the free end of the horizontal leg 72. A second length-wise extension 78 is provided on the free end of the vertical leg (central beam 70) of the "L"-shaped bracket. As discussed in more detail below, these extensions 76 and 78 mate with length-wise extensions on a side molding piece 60 in a snap-fitting manner, so as to secure the molding piece to the bracket.

The vertical leg (central beam 70) of the "L"-shaped bracket portion also defines a pair of parallel, length-wise, extended protrusions 80 and 81 and define a channel therebetween. As discussed in more detail below, the protrusions 80 and 81 and the channel therebetween help to align a corner bracket at each corner of the cover structure.

Preferably, each of the four side edges of the rectangular panel 56 are provided with a bracket 58. In addition, a side molding piece 60 is secured along the length of each bracket 58. In particular, each side molding piece 60 is formed as an extruded aluminum or aluminum alloy member. However, other materials (including other metals, plastics or the like) and other manufacturing processes may be used as an alternative.

In the illustrated embodiment, each side molding piece 60 has a smooth, curved panel 82, which defines a convex surface and a concave surface. A pair of length-wise extensions 84 and 86 extend from the concave surface for engagement with the lengthwise extensions 76 and 78, respectively, of a bracket 58. More specifically, the extension 84 is curved to generally mate with the curvature of the extension 76 (as best shown in FIG. 4). The extension 86 is spaced apart from the extension 84 by a distance suitable to abut and urge against the extension 78. Furthermore, the curvature of the extension 78 and a portion of the upper leg 66 adjacent the extension 78 generally mates with the concave curvature of the side molding piece 60, at the location at which the side molding piece and the extension 78 and upper leg 66 engage. By virtue of the natural spring tension of the material from which the side molding is made, the side molding 60 is snap-fitted and, thereby, coupled to the bracket 58, as shown in FIG. 4.

As shown in FIG. 4, the side molding pieces 60 are preferably provided with an extended portion 88, which extends below the extension 84 and overlaps the upper portion of the bed side wall, when the cover structure is in the closed position. The extended portion 88 tends to provide a smoother transition between the cover structure 30 and the bed side walls and allows the cover structure to be readily and aesthetically disposed on various truck makes and models having differing side wall tapering angles (generally shown as angle α in FIG. 4). In preferred embodiments, the side molding piece 60 that extends along the rear side edge of the cover structure (i.e., the edge directly above the tailgate of the truck bed) does not have the extended portion 88. In this manner, the side molding 60 does not overlap and interfere with the operation of the tailgate. Accordingly, the tailgate of the truck bed may opened and closed, while the cover 30 remains in the closed position.

The front side edge of the cover 30 (i.e., the edge facing the truck cab) may be provided with a bracket 58 and a side molding 60 in the manner discussed above. The side molding 60 on the front side edge may or may not include the extended portion 88. Alternatively, the molding 60 and/or bracket 58 may be omitted from the front side edge.

As shown in FIGS. 2 and 3, the cover structure 30 includes corner molding pieces 90, which define a smooth, rounded corner between perpendicular side molding pieces 60, at the four corners of the cover structure. Preferably, the corner molding pieces are each formed of a molded plastic material. However, other suitable materials (including metal) and other suitable manufacturing processes may be used to form the corner molding pieces. In the illustrated embodiment, the corner molding pieces 90 are each provided with a threaded shaft 92, for connection with a corner bracket 94, as shown in the partial exploded view of FIG. 6.

Figure 6:
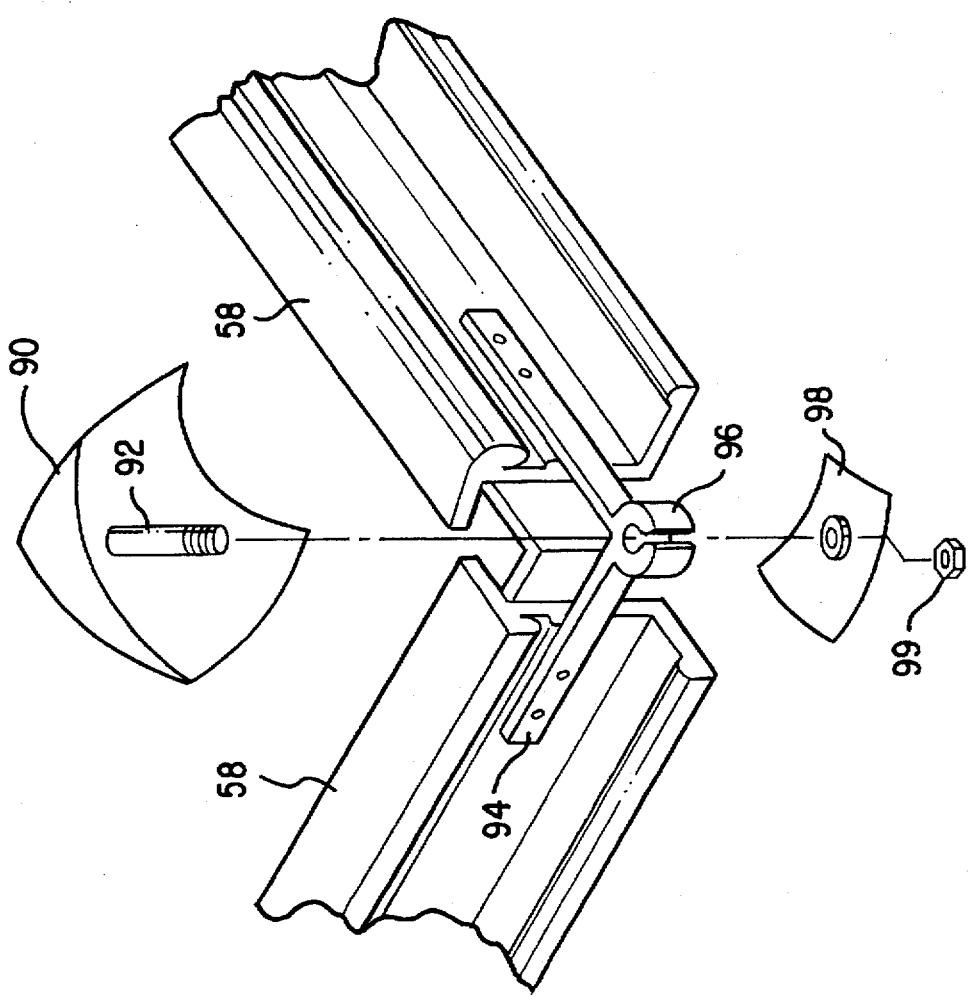
FIG. 6 is an exploded perspective view of a corner molding member and corner bracket of the cover of FIGS. 2-5.

The corner bracket 94 shown in FIG. 6 is, generally, an "L"-shaped bracket having a "C"-shaped receptacle 96 for receiving the shaft 92 of a corner molding piece 90. A lower plate 98 and a threaded nut 99 engage and secure to the free end of the shaft 92 extending through the receptacle 96, to thereby secure the corner molding piece 90 to the corner bracket 94. Each leg of the "L"-shaped corner bracket 94 is disposed within a channel defined by the protrusions 80 and 81 of a respective bracket 58, as shown in FIG. 6. Rivets or other suitable connecting means connect the corner bracket legs to the brackets 58. Once the side molding pieces 60 are fitted in place, the rivets or other connecting means and the corner bracket legs are concealed behind the side molding pieces. The corner molding pieces then conceal the rest of the corner bracket, and define a smooth curved molding around the periphery of the panel structure 56, as shown in FIGS. 2 and 3.

In a preferred embodiment, one or more support beams 100 is provided within the sheet of light-weight material 46, for added strength. In the illustrated embodiment, a support beam 100 is shown as a double "T"-beam, formed of an extruded aluminum or aluminum alloy. However, other configurations, materials and manufacturing processes may be used as an alternative. Preferably, a support beam 100 is provided at the connection location of each strut 34 and 36, so as to strengthen the connection of the struts to the panel structure 56.

Therefore, according to embodiments described above, a hard shell tonneau cover is provided for covering the bed of a pickup truck or for other suitable applications. The composite layered panel structure 56 may be formed with any suitable dimensions, depending upon the application of use. For example, the panel structure 56 may be readily cut or assembled in suitable sizes to fit a variety of truck beds. The brackets 58 and side molding 60 are configured to function with a variety of truck bed dimensions and allow the cover structure 30 to be readily adapted to a variety of truck models and makes. The curvature of the side molding tends to provide an aesthetically pleasing transition between the cover structure and the truck side walls, for a variety of side wall taper angles α.

The rigidity of the panel structure 56 and the support mechanisms (e.g., struts 34 and 36) allow the cover to be readily disposed in an open position (as shown in FIG. 3) for easy access to the bed interior. The latches 36 and 40 and latch engaging members 42 and 44 are accessible only from the interior of the bed when the cover is in the closed position (FIG. 2). Furthermore, the cover does not attach to or interfere with the tailgate of the truck bed, such that the tailgate may be opened and closed, while the cover 30 is in the closed position (FIG. 2). These features, as well as other features that will be readily apparent from the above disclosure, provide a convenient, aesthetically pleasing, aerodynamic cover for the bed of a pickup truck or the like.

What is claimed is:

1. A cover for a pickup truck bed having side walls and a bed interior, the cover comprising:

a panel structure defining a generally flat panel with side edges;

a plurality of side brackets, each side bracket secured to a respective side edge of the flat panel, each side bracket having a bottom surface adapted to be disposed adjacent the top edge of the truck bed side walls; and a plurality of side molding pieces, each side molding piece secured to a respective side bracket and having a portion extended below the bottom surface of the side bracket, the extended portion adapted to extend adjacent and overlap a portion of the truck side wall upon the bottom surface of the associated bracket being disposed adjacent the top edge of the truck bed side walls.

2. A cover for a pickup truck bed having side wails and a bed interior, the cover comprising:

a generally rigid panel structure defining side edges;

a plurality of side brackets, each side bracket secured to a respective side edge of the panel structure, each side bracket having a pair of extensions; and a plurality of side molding pieces, each side molding piece having a pair of extensions adapted to snap-fit between the extensions of the side brackets.

3. A cover as recited in claim 2, further comprising a pair of support members coupled to the panel for selectively supporting the panel in an inclined position relative to the plane of the truck bed.

* * * * *